(12) United States Patent
Dose

(10) Patent No.: US 10,726,179 B1
(45) Date of Patent: Jul. 28, 2020

(54) CIRCUIT DESIGN SUPPORTING METHOD AND STORAGE MEDIUM

(71) Applicants: Kabushiki Kaisha Toshiba, Minato-ku, Tokyo (JP); Toshiba Electronic Devices & Storage Corporation, Minato-ku, Tokyo (JP)

(72) Inventor: Masafumi Dose, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/526,267

(22) Filed: Jul. 30, 2019

(30) Foreign Application Priority Data

Mar. 13, 2019 (JP) .................................. 2019-045850

(51) Int. Cl.
| | |
|---|---|
| *G06F 30/327* | (2020.01) |
| *G06F 30/33* | (2020.01) |
| *G06F 30/367* | (2020.01) |
| *G06F 111/08* | (2020.01) |
| *G06F 119/06* | (2020.01) |

(52) U.S. Cl.
CPC ............ *G06F 30/327* (2020.01); *G06F 30/33* (2020.01); *G06F 30/367* (2020.01); *G06F 2111/08* (2020.01); *G06F 2119/06* (2020.01)

(58) Field of Classification Search
CPC ...... G06F 30/327; G06F 30/367; G06F 30/33; G06F 2111/08; G06F 2119/06
USPC ......................................................... 716/109
See application file for complete search history.

(56) References Cited

U.S. PATENT DOCUMENTS

| | | | |
|---|---|---|---|
| 6,915,497 B2 | 7/2005 | Kitahara | |
| 8,868,396 B1* | 10/2014 | Shirazi | ................... G06F 30/33 703/14 |
| 10,325,042 B1* | 6/2019 | Sharma | ................... G06F 30/33 |
| 10,423,740 B2* | 9/2019 | Rabinovitch | ........... G06F 30/33 |
| 2009/0300564 A1* | 12/2009 | Kanazawa | .......... G06F 30/3323 716/106 |
| 2012/0253712 A1 | 10/2012 | Sugiyama et al. | |
| 2016/0161557 A1* | 6/2016 | Mazzawi | ......... G01R 31/31703 714/732 |

(Continued)

FOREIGN PATENT DOCUMENTS

| | | |
|---|---|---|
| JP | 3990250 B2 | 10/2007 |
| JP | 5338919 B2 | 11/2013 |

(Continued)

*Primary Examiner* — Suresh Memula
(74) *Attorney, Agent, or Firm* — White & Case LLP

(57) ABSTRACT

According to one embodiment, a circuit design supporting method comprising: generating first determination information based on first information obtained by a cycle based logic simulation; extracting glitch generation sources; generating second determination information based on second information obtained based on the first information by considering glitch; comparing the first and the second determination information to each other and determining whether or not a comparison result satisfies a condition; and performing the generating the second determination information and the determining for each of the glitch generation sources and presenting, to a user, one or a plurality of glitch generation sources in which the comparison result satisfies the condition.

18 Claims, 14 Drawing Sheets

(56) References Cited

U.S. PATENT DOCUMENTS

2018/0260311 A1* 9/2018 Barak ................ G06F 11/3672

FOREIGN PATENT DOCUMENTS

| JP | 5707921 B2 | 4/2015 |
| JP | 5831067 B2 | 12/2015 |

* cited by examiner

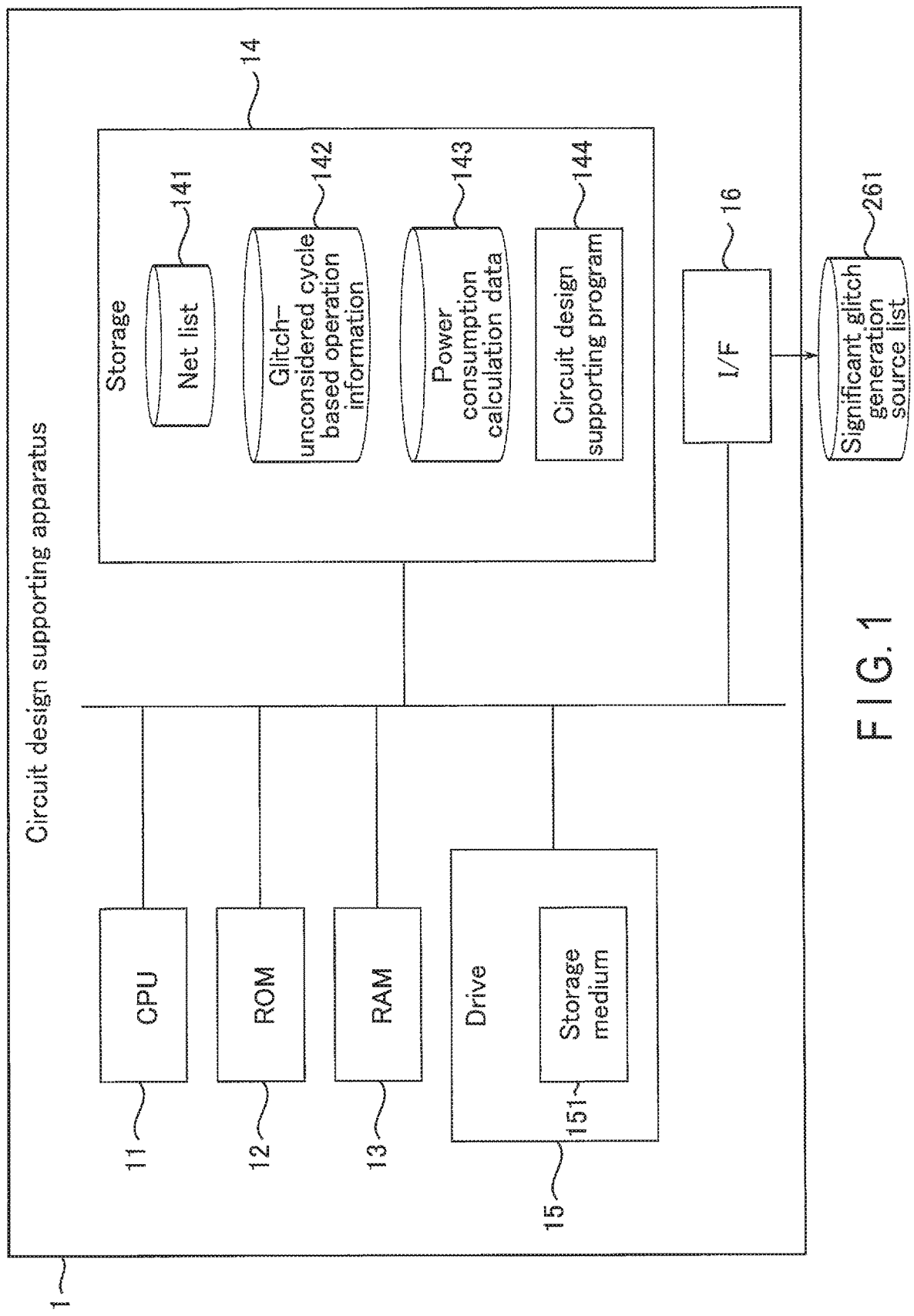
F I G. 1

| Target node | Type | Toggle rate (T) | Duty (D) |
|---|---|---|---|
| P1 | Primary input | 0.3 | 0.5 |
| P2 | Primary input | 0.4 | 0.6 |
| AND | Combination cell of two or more inputs | Tin1 × Din2 + Tin2 × Din1 | Din1 × Din2 |
| XOR | Combination cell of two or more inputs | Tin1+Tin2 | Din1 × (1−Din2) + (1−Din1) × Din2 |
| BUF1, BUF2 | Non-glitch generation source | Tin | Din |
| INST1_1 | Black box cell | Tin × 1.1 | Din |
| INST1_2 | Black box cell | Tin × 2 | Din |
| INST2 | Black box cell | Tin × 1.8 | Din |

| Target node | Type |
|---|---|
| P1 | Primary input |
| P2 | Primary input |
| AND | Combination cell of two or more inputs |
| XOR | Combination cell of two or more inputs |
| INST1_1 | Black box cell |
| INST1_2 | Black box cell |
| INST2 | Black box cell |
F I G. 7

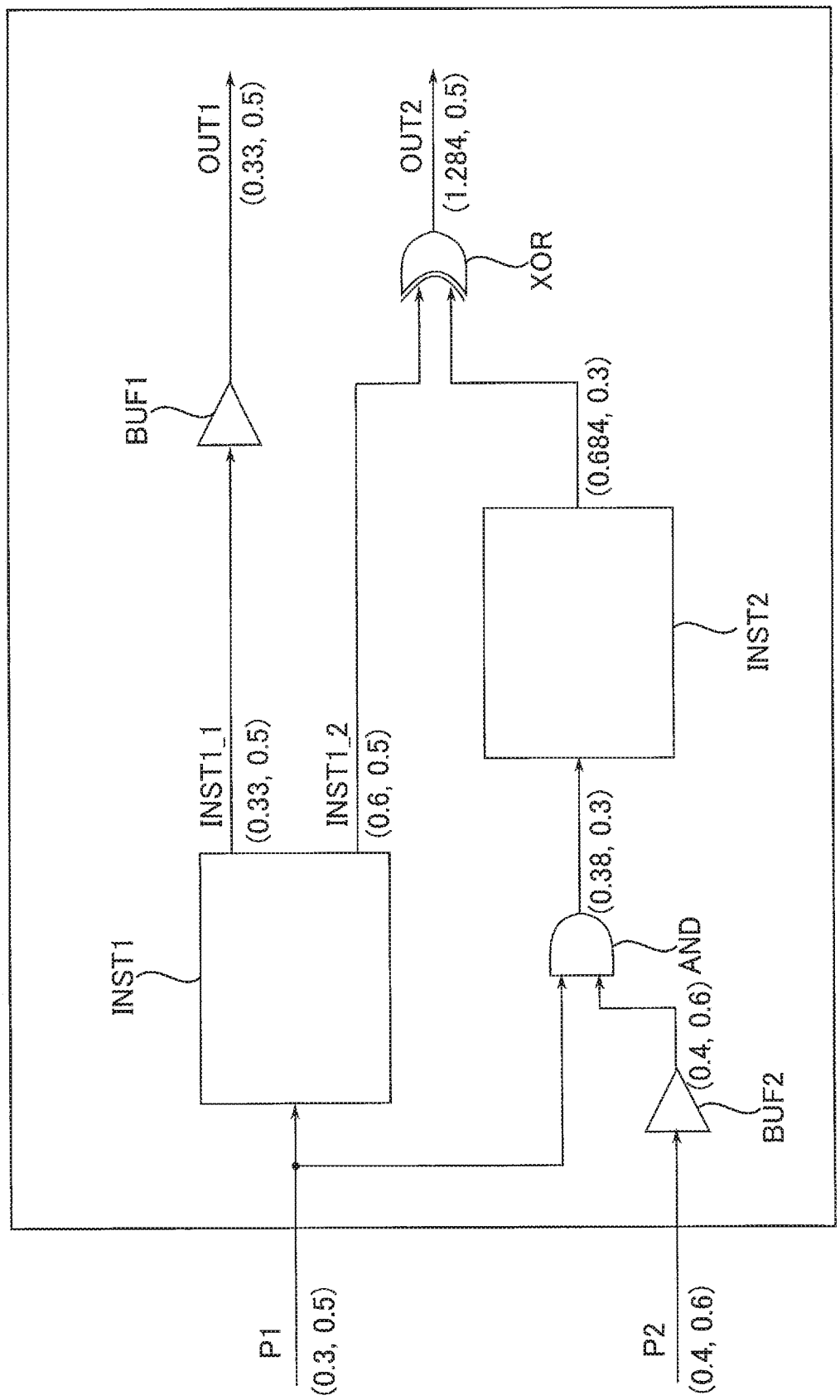
F I G. 9

| Target node | Type | Toggle rate (T) | Duty (D) |
|---|---|---|---|
| P1 | Primary input | 0.3 × 1.3 | 0.5 |
| P2 | Primary input | 0.4 × 1.3 | 0.6 |
| AND | Combination cell of two or more inputs | (Tin1 × Din2 + Tin2 × Din1) × 1.3 | Din1 × Din2 |
| XOR | Combination cell of two or more inputs | (Tin1+Tin2) × 1.3 | Din1 × (1−Din2) +(1−Din1) × Din2 |
| BUF1, BUF2 | Non-glitch generation source | Tin | Din |
| INST1_1 | Black box cell | Tin × 1.1 × 1.3 | Din |
| INST1_2 | Black box cell | Tin × 2 × 1.3 | Din |
| INST2 | Black box cell | Tin × 1.8 × 1.3 | Din |

F I G. 10

| Node at which glitch may occur | Type | Power consumption comparison result | Threshold | Determination result |
|---|---|---|---|---|
| P1 | Primary input | 0.8064 | 0.5 | Countermeasure required |
| P2 | Primary input | 0.396 | 0.5 | |
| AND | Combination cell of two or more inputs | 0.5244 | 0.5 | Countermeasure required |
| XOR | Combination cell of two or more inputs | 0.3852 | 0.5 | |
| INST1_1 | Black box cell | 0.198 | 0.5 | |
| INST1_2 | Black box cell | 0.36 | 0.5 | |
| INST2 | Black box cell | 0.4104 | 0.5 | |

F I G. 14

US 10,726,179 B1

CIRCUIT DESIGN SUPPORTING METHOD AND STORAGE MEDIUM

CROSS-REFERENCE TO RELATED APPLICATIONS

This application is based upon and claims the benefit of priority from Japanese Patent Application No. 2019-045850, filed Mar. 13, 2019, the entire contents of which are incorporated herein by reference.

FIELD

Embodiments described herein relate generally to a circuit design supporting method and a storage medium.

BACKGROUND

Cycle based logic simulation is known as a method for estimating power consumption of a circuit at a design phase.

BRIEF DESCRIPTION OF THE DRAWINGS

FIG. 1 is a block diagram to explain a hardware configuration of a circuit design supporting apparatus according to an embodiment.

FIG. 3 is a conceptual diagram to explain a glitch-unconsidered cycle based operation information according to the embodiment.

FIG. 7 is a conceptual diagram to explain a glitch generation source list according to the embodiment.

FIG. 9 is a schematic diagram to explain glitch-unconsidered determination operation information according to the embodiment.

FIG. 10 is a conceptual diagram to explain glitch-considered cycle based operation information according to the embodiment.

FIG. 14 is a conceptual diagram to explain a significant glitch generation source list according to the embodiment.

DETAILED DESCRIPTION

Figure 2:
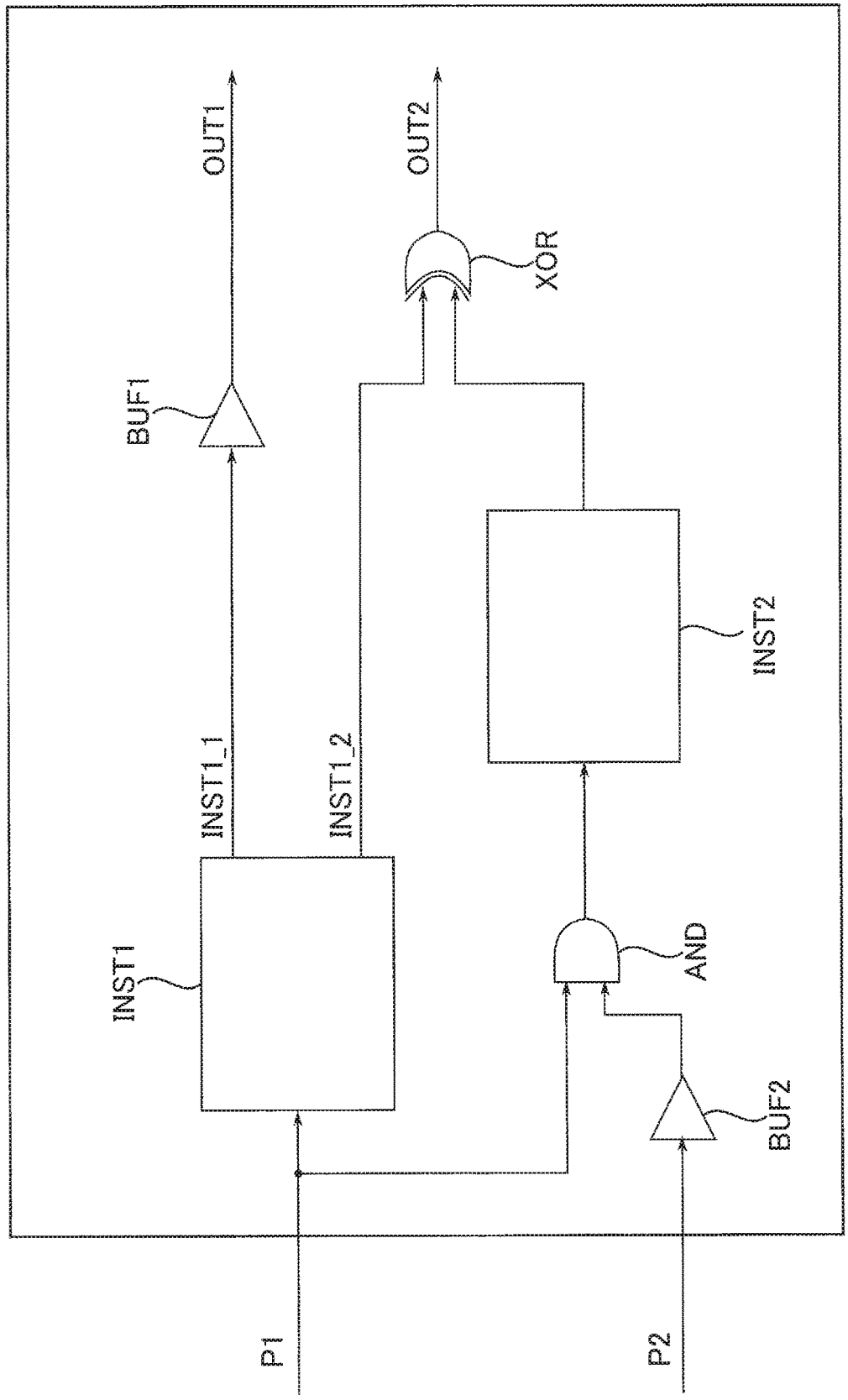
FIG. 2 is a circuit diagram to explain schematically a net list according to the embodiment.

In general, according to one embodiment, a circuit design supporting method includes: generating first determination operation information by performing a first probability propagation of first operation information of a circuit, the first operation information being obtained by performing a cycle based logic simulation on the circuit; extracting a plurality of glitch generation sources from the circuit; generating second determination operation information by performing a second probability propagation of second operation information of the circuit and, the second operation information being obtained based on the first operation information by considering first glitch for one of the glitch generation sources; comparing the first determination operation information and the second determination operation information to each other and determining whether or not a comparison result satisfies a condition; and performing the generating of the second determination operation information and the determining for each of the glitch generation sources and presenting, to a user, one or a plurality of glitch generation sources in which it is determined that the comparison result satisfies the condition.

Hereinafter, an embodiment will be described with reference to the drawings. In the following descriptions, components having the same functions and configurations are denoted by the common reference symbols.

1. Embodiment

A circuit design supporting method according to an embodiment will be described. The circuit design supporting method according to the embodiment is applied to, for example, a technology of analyzing power consumption of a designed semiconductor chip such as a large-scale integrated circuit (LSI) using software. For example, a node at which glitch which may act as a significant error factor of the power consumption of the semiconductor chip occurs is specified by using the circuit design supporting method according to the embodiment.

1.1 Configuration

A configuration of a circuit design supporting apparatus that performs the circuit design supporting method according to the embodiment will be described.

1.1.1 Hardware Configuration

A hardware configuration of the circuit design supporting apparatus according to the embodiment will be described with reference to FIG. 1.

As shown in FIG. 1, a circuit design supporting apparatus 1 includes a central processing unit (CPU) 11, a read only memory (ROM) 12, a random access memory (RAM) 13, a storage 14, a drive 15, and an interface 16. The circuit design supporting apparatus 1 has functions of calculating power consumption at a design phase of a circuit in a semiconductor chip such as an LSI, thereby extracting a significant glitch generation source and presenting, to a user, the extracted significant glitch generation source, which may have a significant influence on the power consumption.

The CPU 11 executes various processing programs stored in the ROM 12 and uses the RAM 13 as a work area, so as to control the overall operation of the circuit design supporting apparatus 1.

For example, the storage 14 is an auxiliary storage apparatus such as a hard disk drive (HDD) and a solid state drive (SSD). A circuit design supporting program 144 executed by the circuit design supporting apparatus 1 is stored in the storage 14. For example, a net list 141, glitch-unconsidered cycle based operation information 142, and power consumption calculation data 143 are stored in the storage 14, as input information required when the circuit design supporting program 144 is executed.

The net list 141 is design information of a circuit such as a semiconductor chip, which is configured by logical gates such as AND circuits and exclusive OR circuits. The net list 141 is a design information of analysis target circuit from which the circuit design supporting apparatus 1 extracts the significant glitch generation source.

The glitch-unconsidered cycle based operation information 142 includes operation information obtained by a cycle based logic simulation on the net list 141. The cycle based logic simulation is, for example, a method of generating operation information of an analysis target circuit by statically determining an operation order while ignoring delay times of various elements and operating for each clock cycle. The cycle based logic simulation is different from a comparative logical simulation considering the delay times of the various elements, and omits a dynamic action of the analysis target circuit. Thus, the cycle based logic simulation has features of a shorter turn around time (TAT) and a smaller output size than the comparative logical simulation. Therefore, although the glitch-unconsidered cycle based operation information 142 can be easily generated, glitch causing an unintended signal change in a clock cycle is not considered.

The power consumption calculation data 143 includes various types of information required for calculating power consumption of the analysis target circuit. For example, the power consumption calculation data 143 includes interconnect capacitance and detailed power consumption information of each circuit.

The circuit design supporting program 144 is a program causing the circuit design supporting apparatus 1 to perform circuit design supporting processing. The circuit design supporting processing includes processing in which processing of calculating power consumption in consideration of the influence of glitch is performed for each glitch generation source, and thus a significant glitch generation source is extracted, and a significant glitch generation source list 261 as an extraction result is presented to a user. The circuit design supporting program 144 may be stored in the ROM 12. Details of the circuit design supporting program 144 will be described later.

The drive 15 is, for example, a compact disk (CD) drive, a digital versatile disk (DVD) drive, or the like. The drive 15 is an apparatus that reads a program stored in a storage medium 151. The type of the drive 15 may be appropriately selected in accordance with the type of the storage medium 151. The net list 141, the glitch-unconsidered cycle based operation information 142, the power consumption calculation data 143, and the circuit design supporting program 144 may be stored in the storage medium 151.

The storage medium 151 is a medium in which information such as a program is stored by an electric, magnetic, optical, mechanical, or chemical action such that a computer, other apparatuses, a machine, and the like can read the information such as the program.

The interface 16 is an interface that exchanges information between the circuit design supporting apparatus 1 and the outside of the circuit design supporting apparatus 1. For example, the interface 16 includes any interface such as a communication interface in which any wired or wireless communication method is applied, a printer, and a graphical user interface (GUI) with a display screen (for example, liquid crystal display (LCD), electroluminescence (EL) display, cathode ray tube, or the like). The interface 16 has a function of presenting, to a user, the significant glitch generation source list 261 generated in the circuit design supporting apparatus 1.

FIG. 2 is a circuit diagram schematically illustrating a specific example of the net list according to the embodiment.

As shown in FIG. 2, for example, the net list 141 includes instances INST1 and INST2, an AND circuit AND, an exclusive OR circuit XOR, and buffer circuits BUF1 and BUF2.

The instance INST1 includes an input terminal, a first output terminal coupled to a node INST1_1, and a second output terminal coupled to a node INST1_2. The input terminal is coupled to a node P1 to which a first primary input is supplied.

The buffer circuit BUF1 includes an input terminal coupled to the node INST1_1 and an output terminal coupled to a node OUT1 from which a first output signal is output.

The buffer circuit BUF2 includes an input terminal and an output terminal. The input terminal is coupled to a node P2 to which a second primary input is supplied. The output terminal is coupled to a second input terminal of the AND circuit AND.

The AND circuit AND includes the first input terminal coupled to the node P1, the second input terminal, and an output terminal coupled to an input terminal of the instance INST2.

The instance INST2 includes the input terminal and an output terminal coupled to a first input terminal of the exclusive OR circuit XOR.

The exclusive OR circuit XOR includes the first input terminal, a second input terminal coupled to the node INST1_2, and an output terminal coupled to a node OUT2 from which a second output signal is output.

FIG. 3 is a conceptual diagram illustrating a specific example of glitch-unconsidered cycle based operation information according to the embodiment. FIG. 3 corresponds to a result of a cycle based logic simulation on the net list 141 illustrated in FIG. 2.

As shown in FIG. 3, in the glitch-unconsidered cycle based operation information 142, each node (target node) in the net list 141 is associated with the type of the target node, a toggle rate T and a Duty D of a signal to be supplied to the target node.

For example, regarding the type, a target node is classified into any of "primary input", "combination cell of two or more inputs", "black box cell", and "non-glitch generation source", in terms of whether or not glitch may occur in an element having an output terminal coupled to the target node. The types of "primary input", "combination cell of two or more inputs", and "black box cell" correspond to a case where there is a possibility that glitch occurs in a preceding element coupled to the target node, and an influence of the glitch is superimposed on the target node. The type of "non-glitch generation source" corresponds to a case where a possibility of glitch occurring in the preceding element coupled to the target node is low (or it can be considered that there is no possibility).

More specifically, in a case where a signal from an outside of the net list 141 is input to the target node, the target node is classified into the type of "primary input". In the net list 141, the nodes P1 and P2 are classified into the type of "primary input".

In a case where an element having an output terminal coupled to the target node is a logic circuit that determines an output based on a combination of two or more inputs, the target node is classified into the type of "combination cell of two or more inputs". In the net list 141, output nodes (referred to as nodes AND and XOR respectively below) of the AND circuit AND and the exclusive OR circuit XOR are classified into the type of "combination cell of two or more inputs".

In a case where a specific configuration of an element having an output terminal coupled to the target node is not determined (the element is a black box), the target node is classified into the type of "black box cell". In the net list 141, the nodes INST1_1 and INST1_2, and an output node (referred to as a node INST2 below) of the instance INST2 are classified into the type of "black box cell".

In a case where the target node does not correspond to any of "primary input", "combination cell of two or more inputs", and "black box cell", which are described above, the target node is classified into the type of "non-glitch generation source". In the net list 141, output nodes (referred to as nodes BUF1 and BUF2 respectively below) of the buffer circuits BUF1 and BUF2 are classified into the type of "non-glitch generation source".

The toggle rate T and the duty D are specific examples of the operation information used in the circuit design supporting processing. The toggle rate T indicates, for example, an expected value of the number of times of a signal being inverted in one cycle of a reference clock. The duty D indicates, for example, a proportion of a period in which a signal having any logical level of an "H" level and an "L" level is at the "H" level.

In the example in FIG. 3, the toggle rate T and the duty D of the target nodes P1 and P2 are set to (T, D)=(0.3, 0.5) and (0.4, 0.6), respectively.

The toggle rate T and the duty D of the target nodes AND and XOR are set to (Tin1×Din2+Tin2×Din1, Din1×Din2) and (Tin1+Tin2, Din1(1−Din2)+(1−Din1)Din2), respectively. It should be noted that Tin1 and Din1 indicate the toggle rate T and the duty D at the first input terminal of a cell having an output terminal coupled to the target node, respectively. Tin2 and Din2 indicate the toggle rate T and the duty D at the second input terminal of the cell having an output terminal coupled to the target node, respectively.

The toggle rate T and the duty D of the target nodes INST1_1, INST1_2, INST2 are set to (T, D)=(Tin×1.1, Din), (Tin×2, Din), and (Tin×1.8, Din), respectively. It should be noted that Tin and Din indicate the toggle rate T and the duty D at the input terminal of a cell having an output terminal coupled to the target node, respectively.

The toggle rate T and the duty D of each of the target nodes BUF1 and BUF2 are set to (T, D)=(Tin, Din).

It should be noted that the net list 141 and the glitch-unconsidered cycle based operation information 142 illustrated in FIGS. 2 and 3 are just examples and are not limited to operation information of the circuit configuration illustrated in FIG. 2 and various circuit configurations illustrated in FIG. 3.

1.1.2 Functional Configuration

Next, a functional configuration of the circuit design supporting apparatus according to the embodiment will be described.

The CPU 11 of the circuit design supporting apparatus 1 develops, for example, the circuit design supporting program 144 stored in the storage 14 on the RAM 13. The CPU 11 interprets and executes the circuit design supporting program 144 developed on the RAM 13 to control the components.

Figure 4:
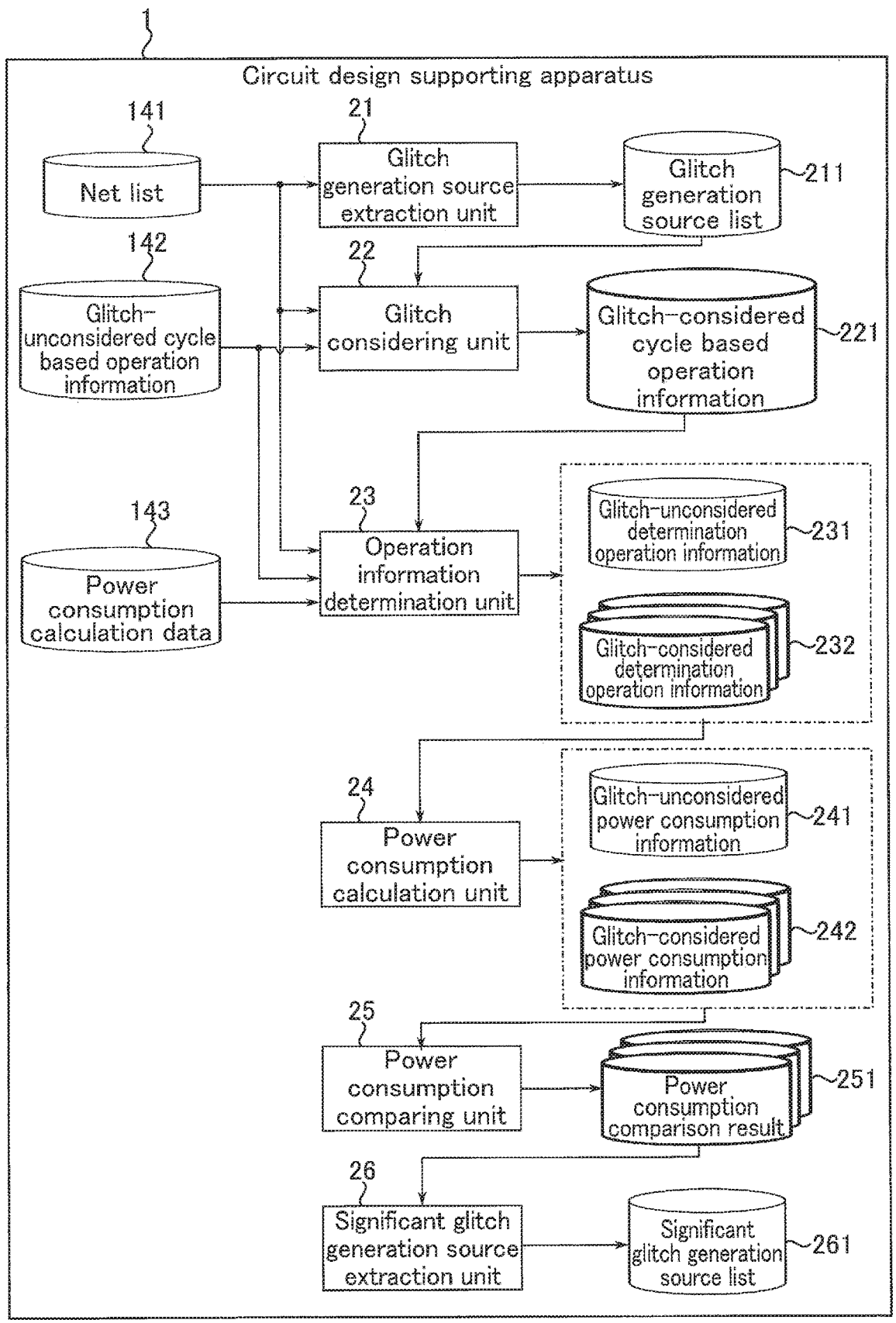
FIG. 4 is a block diagram to explain a functional configuration of the circuit design supporting apparatus according to the embodiment.

FIG. 4 is a block diagram illustrating the functional configuration of the circuit design supporting apparatus according to the embodiment.

As shown in FIG. 4, when performing the circuit design supporting processing, the circuit design supporting apparatus 1 functions as a computer including a glitch generation source extraction unit 21, a glitch considering unit 22, an operation information determination unit 23, a power consumption calculation unit 24, a power consumption comparing unit 25, and a significant glitch generation source extraction unit 26.

The glitch generation source extraction unit 21 reads the net list 141 from the storage 14 and extracts all nodes in the net list 141 as target nodes each having a possibility of glitch occurring. The glitch generation source extraction unit 21 generates a glitch generation source list 211 and transmits the glitch generation source list 211 to the glitch considering unit 22. In the glitch generation source list 211, all the extracted nodes are listed up.

The glitch considering unit 22 reads glitch-unconsidered cycle based operation information 142 from the storage 14 and performs correction on all the nodes in the glitch generation source list 211 in consideration of an influence of glitch. The correction is not correction applicable to the comparative logic simulation considering the delay times of various elements as described above, but correction in a range of being applicable to the cycle based logic simulation. That is, the glitch considering unit 22 statically considers the influence of glitch by performing predetermined correction processing (for example, multiplying a predetermined coefficient or adding a predetermined constant by or to) on the toggle rate T and the duty D in the glitch-unconsidered cycle based operation information 142. Thus, the glitch considering unit 22 generates glitch-considered cycle based operation information 221 and transmits the glitch-considered cycle based operation information 221 to the operation information determination unit 23.

The operation information determination unit 23 performs probability propagation of pieces of operation information of the various elements to an element at the subsequent stage. The propagation is performed using the glitch-unconsidered cycle based operation information 142, and the various elements are considered not to cause glitch to occur. It should be noted that the operation information determination unit 23 may further read power consumption calculation data 143 from the storage 14 and apply the power consumption calculation data 143 to the probability propagation. Thus, the operation information determination unit 23 determines operation information of a signal at the output node of each element in the net list 141 to generate glitch-unconsidered determination operation information 231, and transmits the glitch-unconsidered determination operation information 231 to the power consumption calculation unit 24.

Also, the operation information determination unit 23 performs probability propagation of pieces of operation information of one element considered to cause glitch to occur, to an element at the subsequent stage. The propagation is performed using the glitch-considered cycle based operation information 221. Thus, the operation information determination unit 23 determines operation information of a signal at the output node of each element in the net list 141 to generate glitch-considered determination operation information 232, and transmits the glitch-considered determination operation information 232 to the power consumption calculation unit 24. It should be noted that, as will be described later, regarding the glitch-considered determination operation information 232, a plurality of patterns is generated depending on which one element is considered to cause glitch to occur.

The power consumption calculation unit 24 calculates the power consumption of the net list 141 or an index corresponding to the power consumption in a case of not considering the influence of glitch, based on the glitch-unconsidered determination operation information 231. The power consumption calculation unit 24 generates glitch-unconsidered power consumption information 241 as information indicating the calculation result. Also, the power consumption calculation unit 24 calculates the power consumption of the net list 141 based on each of plural pieces of glitch-considered determination operation information 232, and generates glitch-considered power consumption information 242 as information indicating the calculation result. The power consumption calculation unit 24 transmits the glitch-unconsidered power consumption information 241 and the plural pieces of glitch-considered power consumption information 242 to the power consumption comparing unit 25.

The power consumption comparing unit 25 compares each of the plural pieces of glitch-considered power consumption information 242 to the glitch-unconsidered power consumption information 241 and generates a power consumption comparison result 251 for each of the patterns. The power consumption comparing unit 25 transmits the power consumption comparison result 251 for each of the patterns to the significant glitch generation source extraction unit 26. Each of a plurality of power consumption comparison results 251 includes, for example, information corresponding to a difference between two pieces of power consumption (that is, power consumption in a case of not considering glitch and power consumption in a case of considering glitch).

The significant glitch generation source extraction unit 26 extracts a glitch generation source assumed that glitch occurs in a pattern having a significant increase in power consumption, as a significant glitch generation source, based on the power consumption comparison result 251 for each of the patterns. The significant glitch generation source extraction unit 26 generates the significant glitch generation source list 261 in which the extracted significant glitch generation source is listed up, and presents the significant glitch generation source list 261 to the user.

With the above-described functional configuration, the circuit design supporting apparatus 1 can perform the circuit design supporting processing.

1.2 Operation

Next, an operation of the circuit design supporting apparatus according to the embodiment will be described.

1.2.1 Outline of Circuit Design Supporting Processing

Firstly, an outline of the circuit design supporting processing in the circuit design supporting apparatus according to the embodiment will be described with reference to the flowchart illustrated in FIG. 5.

Figure 5:
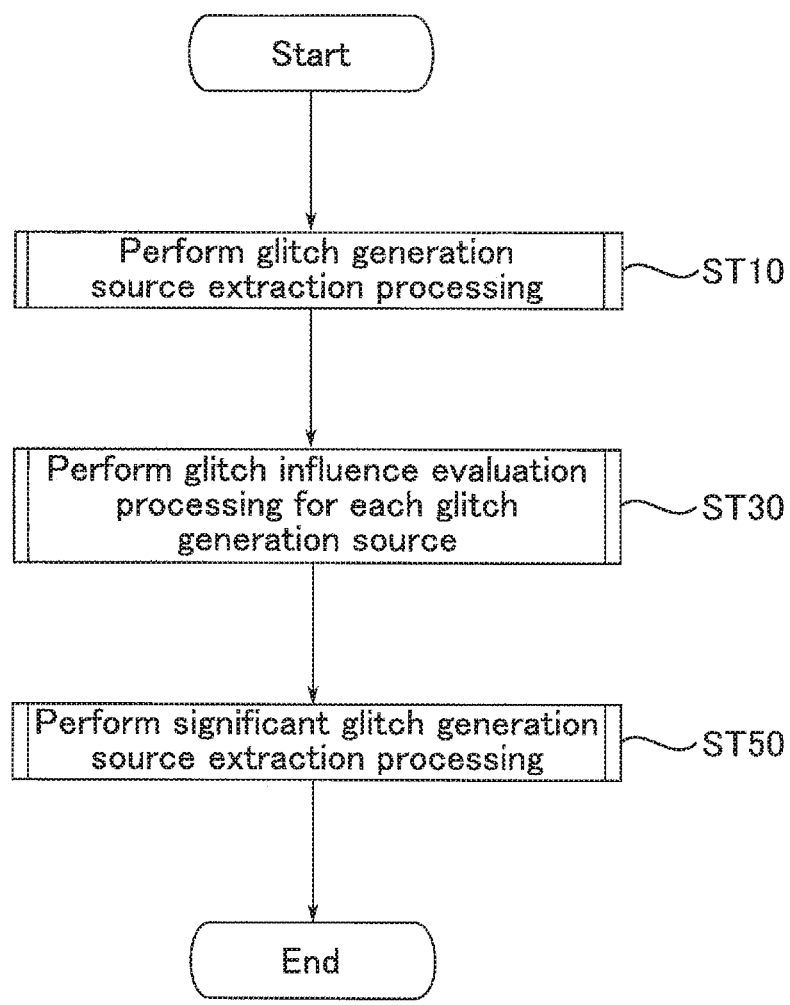
FIG. 5 is a flowchart to explain circuit design supporting processing in the circuit design supporting apparatus according to the embodiment.

As shown in FIG. 5, in Step ST10, the circuit design supporting apparatus 1 performs glitch generation source extraction processing. Thus, the circuit design supporting apparatus 1 lists up all nodes having a possibility of glitch occurring from the net list 141, to generate the glitch generation source list 211.

In Step ST30, the circuit design supporting apparatus 1 performs glitch influence evaluation processing for each glitch generation source. Thus, the circuit design supporting apparatus 1 evaluates the degree of the influence in a case where glitch occurs in the glitch generation source, for each of the extracted glitch generation sources. The circuit design supporting apparatus 1 generates the plurality of power consumption comparison results 251 as evaluation results.

In Step ST50, the circuit design supporting apparatus 1 performs significant glitch generation source extraction processing. Thus, the circuit design supporting apparatus 1 lists up a glitch generation source which may have a significant influence on the power consumption among the glitch generation sources, as a significant glitch generation source, based on the plurality of power consumption comparison results 251, and thus the circuit design supporting apparatus 1 generates the significant glitch generation source list 261. The circuit design supporting apparatus 1 presents the significant glitch generation source list 261 to the user, and thus can specifically indicate a node at which a glitch countermeasure is required in the net list 141.

Thus, the circuit design supporting processing ends.

1.2.2 Details of Circuit Design Supporting Processing

Next, details of the circuit design supporting processing in the circuit design supporting apparatus according to the embodiment will be described. It should be noted that in the details of the circuit design supporting processing as follows, a case where the glitch-unconsidered cycle based operation information 142 described with reference to FIG. 3 is applied to the net list 141 described with reference to FIG. 2 will be described as an example.

1.2.2.1 Glitch Generation Source Extraction Processing

Firstly, glitch generation source extraction processing in the circuit design supporting processing according to the embodiment will be described with reference to the flowchart illustrated in FIG. 6. Steps ST11 to ST14 in FIG. 6 correspond to Step ST10 described with reference to FIG. 5. In Steps ST11 to ST14, the circuit design supporting apparatus 1 functions as the glitch generation source extraction unit 21.

Figure 6:
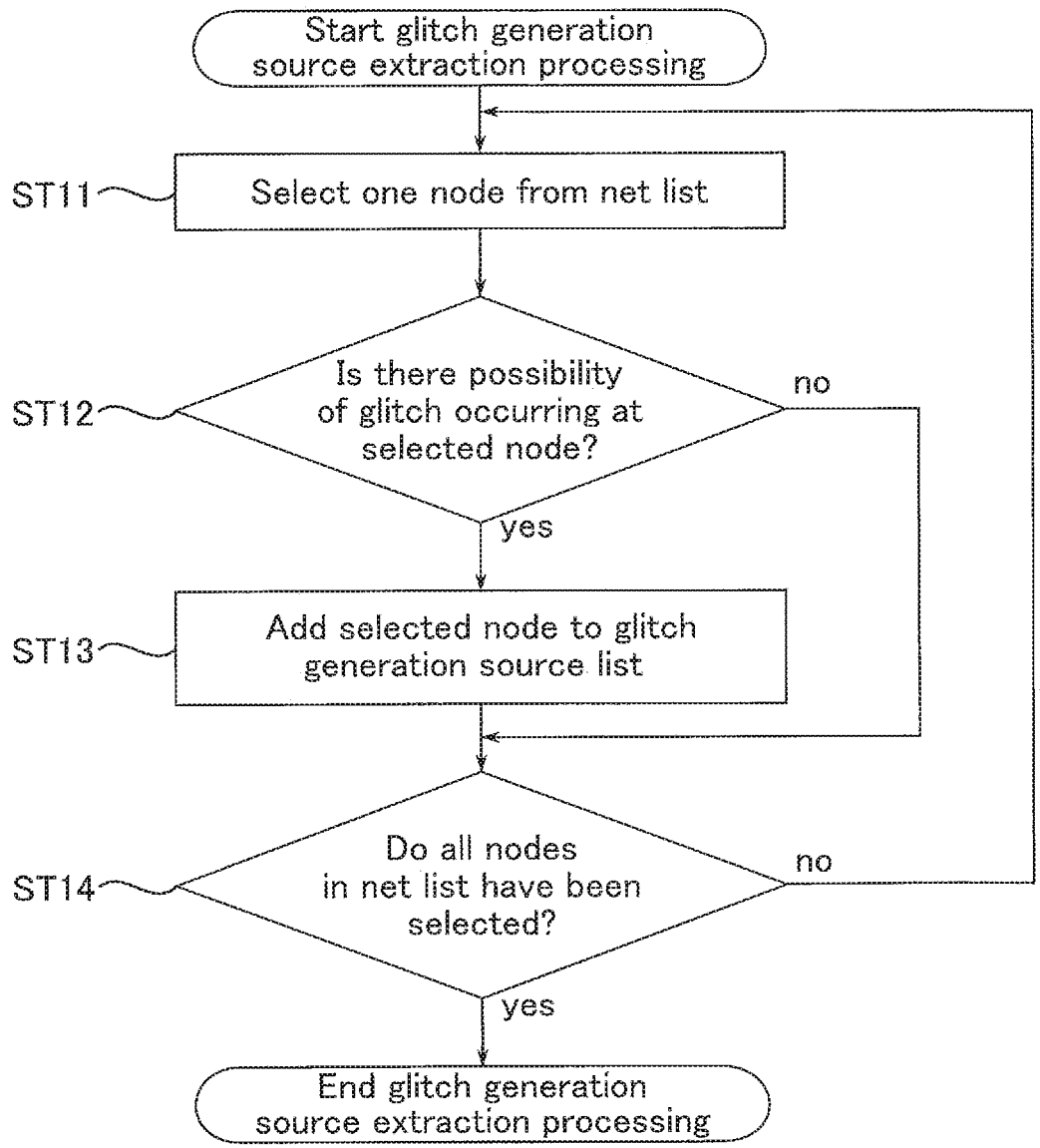
FIG. 6 is a flowchart to explain glitch generation source extraction processing in the circuit design supporting processing in the circuit design supporting apparatus according to the embodiment.

As shown in FIG. 6, in Step ST11, the glitch generation source extraction unit 21 selects one node from circuit information shown in the net list 141. Specifically, in the example in FIG. 2, the glitch generation source extraction unit 21 selects any one node of the nodes P1, P2, AND, XOR (OUT2), BUF1 (OUT1), BUF2, INST1_1, INST1_2, and INST2.

In Step ST12, the glitch generation source extraction unit 21 determines whether or not there is a possibility of glitch occurring in the element including an output terminal coupled to the node (selected node) selected in Step ST11 (whether or not there is a possibility of glitch occurring at the selected node).

Specifically, in a case where the type of the selected node is "primary input", "combination cell of two or more inputs", or "black box cell", the glitch generation source extraction unit 21 determines that there is the possibility of glitch occurring at the selected node (yes in Step ST12). Then, the process proceeds to Step ST13. In a case where the type of the selected node is the type other than the above three types, that is, "non-glitch generation source", the glitch generation source extraction unit 21 determines that the possibility of glitch occurring at the selected node is not provided (no in Step ST12). Then, the process proceeds to Step ST14.

In Step ST13, the glitch generation source extraction unit 21 adds the selected node to the glitch generation source list 211.

In Step ST14, the glitch generation source extraction unit 21 determines whether or not all nodes in the net list 141 have been selected. In a case where a not-selected node is provided (no in Step ST14), the process returns to Step ST11. Thus, the processes of Steps ST11 to ST13 as described above repeat until all the nodes are selected. In a case where all the nodes have been selected (yes in Step ST14), the glitch generation source extraction unit 21 determines that generation of the glitch generation source list 211 is completed.

FIG. 7 is a conceptual diagram illustrating the glitch generation source list according to the embodiment. FIG. 7 illustrates an example of the glitch generation source list 211 generated in a case where glitch generation source extraction processing is performed in the net list 141.

As shown in FIG. 7, the nodes BUF1 and BUF2 among the nodes in the net list 141 are excluded from the glitch generation source list 211, and the nodes P1, P2, AND, XOR, INST1_1, INST1_2, and INST2 are listed up in the glitch generation source list 211.

Thus, the glitch generation source extraction processing ends.

1.2.2.2 Glitch Influence Evaluation Processing for Each Glitch Generation Source Next, glitch influence evaluation processing for each glitch generation source in the circuit design supporting processing according to the embodiment will be described with reference to the flowchart illustrated in FIG. 8. Steps ST31 to ST38 in FIG. 8 correspond to Step ST30 described with reference to FIG. 5. In Steps ST31 to ST38, the circuit design supporting apparatus 1 functions as the glitch considering unit 22, the operation information determination unit 23, the power consumption calculation unit 24, and the power consumption comparing unit 25.

Figure 8:
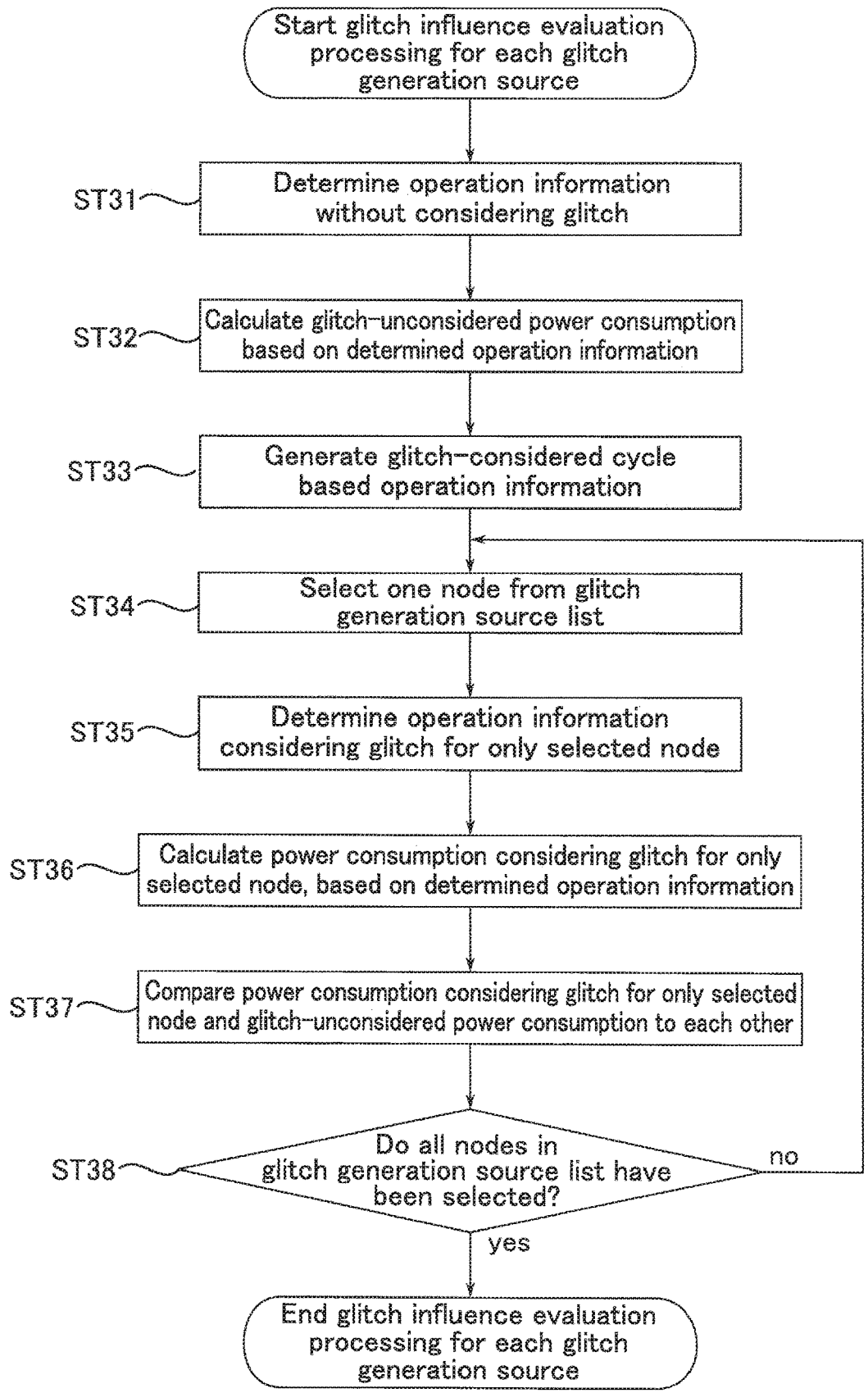
FIG. 8 is a flowchart to explain power consumption calculation processing in the circuit design supporting processing in the circuit design supporting apparatus according to the embodiment.

As shown in FIG. 8, firstly, in Steps ST31 and ST32, power consumption (glitch-unconsidered power consumption information 241) in a case of not considering glitch is calculated.

Specifically, in Step ST31, the operation information determination unit 23 performs probability propagation of operation information of each element in the net list 141 to the element at the subsequent stage, based on the glitch-unconsidered cycle based operation information 142 and the power consumption calculation data 143. Then, the operation information determination unit 23 determines final operation information. Thus, the operation information determination unit 23 generates the glitch-unconsidered determination operation information 231.

FIG. 9 is a schematic diagram illustrating the glitch-unconsidered determination operation information according to the embodiment. In FIG. 9, the toggle rate T and the duty D at each node in the net list 141 are shown as the final operation information after the probability propagation based on the glitch-unconsidered cycle based operation information 142, in a format of (T, D).

As shown in FIG. 9, the toggle rate T and the duty D at the nodes P1 and P2 have values of (T, D)=(0.3, 0.5) and (0.4, 0.6), respectively.

The toggle rate T and the duty D at the nodes INST1_1 and INST1_2 have values of (T, D)=(0.33 (=0.3×1.1), 0.5) and (0.6 (=0.3×2), 0.5), respectively.

The toggle rate T and the duty D at the nodes BUF1 and BUF2 do not change from the toggle rate T and the duty D at the nodes INST1_1 and P2, and thus have values of (T, D)=(0.33, 0.5) and (0.4, 0.6), respectively.

The toggle rate T and the duty D at the node AND have values of (T, D)=(0.38 (=0.3×0.6+0.4×0.5), 0.3 (=0.5×0.6)).

The toggle rate T and the duty D at the node INST2 have values of (T, D)=(0.684 (=0.38×1.8), 0.3).

The toggle rate T and the duty D at the node XOR have values of (T, D)=(1.284 (=0.6+0.684), 0.5 (=0.5(1−0.3)+0.3 (1−0.5))).

Since the glitch-unconsidered determination operation information 231 is generated in this manner, the toggle rates T and the duties D at all the nodes in the net list 141 in a case of not considering glitch are determined.

Descriptions return to the descriptions with reference to the flowchart illustrated in FIG. 8.

In Step ST32, the power consumption calculation unit 24 calculates the power consumption of the net list 141 in a case of not considering glitch, as the glitch-unconsidered power consumption information 241, based on the glitch-unconsidered determination operation information 231.

It is considered that the power consumption tends to increase in accordance with the number of times of the generated signal performing switching. Therefore, in the following descriptions, for easy descriptions, the sum of the toggle rates T at the output nodes of the elements in the net list 141 is assumed as an example of an index corresponding to the power consumption.

The power consumption calculation unit 24 calculates 4.008 (=0.33+0.33+0.6+0.4+0.38+0.684+1.284) being the sum of the toggle rates T at the nodes AND, XOR, INST1_1, INST1_2, INST2, BUF1, and BUF2 in FIG. 9, as the glitch-unconsidered power consumption information 241.

It should be noted that the above-described method of calculating (the index corresponding to) the power consumption is just an example. The calculation method is not limited to the above-described example, and any method may be applied.

In Steps ST33 to ST36, the power consumption (glitch-considered power consumption information 242) in a case of considering glitch for each glitch generation source is calculated.

In Step ST33, the glitch considering unit 22 generates the glitch-considered cycle based operation information 221 in accordance with a predetermined consideration condition. Regarding the consideration condition for glitch for each element, any condition may be set. In the following descriptions, for easy descriptions, it is assumed that a constant coefficient is multiplied by the toggle rate T at the node having a possibility of glitch occurring.

FIG. 10 is a schematic diagram illustrating the glitch-considered cycle based operation information 221 according to the embodiment.

As shown in FIG. 10, regarding the node having a possibility of glitch occurring among the target nodes (that is, the node having a type other than "non-glitch generation source"), a coefficient (1.3) is uniformly multiplied by the toggle rate T in the glitch-unconsidered cycle based operation information 142. Thus, it is possible to add the influence in a case of glitch occurring at the node, in the cycle based operation information.

Descriptions return to the descriptions with reference to the flowchart in FIG. 8 again.

In Step ST34, the operation information determination unit 23 selects one node from the glitch generation sources shown in the glitch generation source list 211. Specifically, the operation information determination unit 23 selects any one node from the nodes P1, P2, AND, XOR, INST1_1, INST1_2, and INST2 illustrated in FIG. 7.

A case of selecting the node P1 from the nodes will be described as an example.

In Step ST35, the operation information determination unit 23 performs probability propagation of operation information of each element in the net list 141 to the element at the subsequent stage, based on the glitch-unconsidered cycle based operation information 142, the power consumption calculation data 143, and the glitch-considered cycle based operation information 221. Then, the operation information determination unit 23 determines the final operation information. In probability propagation, the operation information determination unit 23 applies operation information considering glitch, for only the node (selected node, that is, node P1) selected in Step ST34. The operation information determination unit 23 applies operation information without considering glitch, for the remaining nodes. Thus, the operation information determination unit 23 generates the glitch-considered determination operation information 232 being operation information considering glitch for only the selected node.

Figure 11:
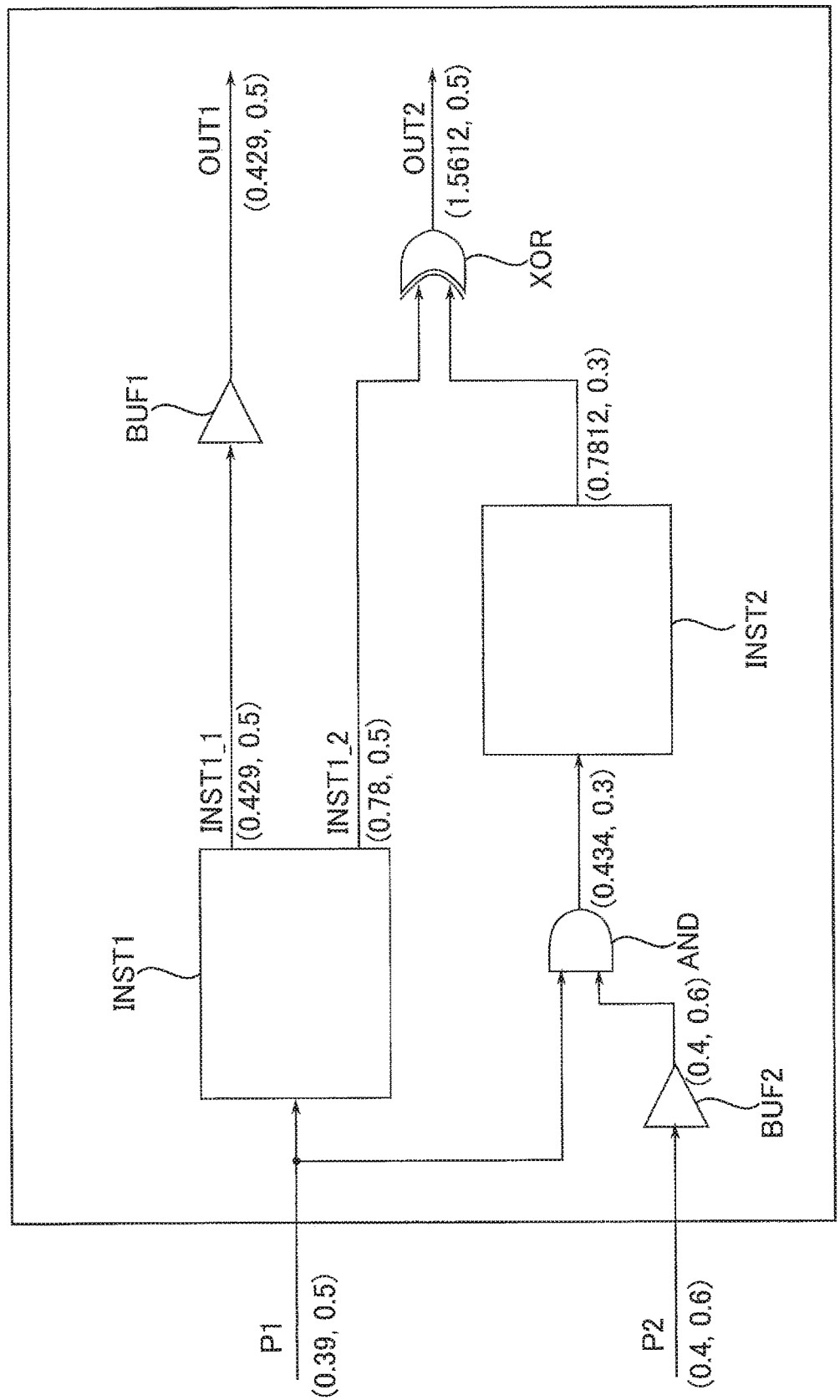
FIG. 11 is a schematic diagram to explain glitch-considered determination operation information according to the embodiment.

FIG. 11 is a schematic diagram illustrating the glitch-considered determination operation information according to the embodiment. In FIG. 11, the toggle rate T and the duty D at each node in the net list 141 are shown as the final operation information, in a format of (T, D). The final operation information is information after probability propagation based on the glitch-considered cycle based operation information 221 regarding the selected node P1 and pieces of glitch-unconsidered cycle based operation information 142 regarding other nodes.

As shown in FIG. 11, the toggle rate T and the duty D at the nodes P1 and P2 have values of (T, D)=(0.39 (=0.3×1.3), 0.5) and (0.4, 0.6), respectively.

The toggle rate T and the duty D at the nodes INST1_1 and INST1_2 have values of (T, D)=(0.429 (=0.39×1.1), 0.5) and (0.78 (=0.39×2), 0.5), respectively.

The toggle rate T and the duty D at the nodes BUF1 and BUF2 do not change from the toggle rate T and the duty D at the nodes INST1_1 and P2, and thus have values of (T, D)=(0.429, 0.5) and (0.4, 0.6), respectively.

The toggle rate T and the duty D at the node AND have values of (T, D)=(0.434 (=0.39×0.6+0.4×0.5), 0.3 (=0.5×0.6)).

The toggle rate T and the duty D at the node INST2 have values of (T, D)=(0.7812 (=0.434×1.8), 0.3).

The toggle rate T and the duty D at the node XOR have values of (T, D)=(1.5612 (=0.78+0.7812), 0.5 (=0.5(1−0.3)+0.3(1−0.5))).

Since the glitch-considered determination operation information 232 is generated in this manner, the toggle rates T and the duties D at all the nodes in the net list 141 in a case of considering glitch for only the selected node P1 are determined.

Descriptions return to the descriptions with reference to the flowchart in FIG. 8 again.

In Step ST36, the power consumption calculation unit 24 calculates the power consumption of the net list 141 as the glitch-considered power consumption information 242, based on the glitch-considered determination operation information 232 in a case of considering glitch for only the selected node P1. Specifically, the power consumption calculation unit 24 calculates 4.8144 (=0.429+0.429+0.78+0.4+0.434+0.7812+1.5612) being the sum of the toggle rates T at the nodes AND, XOR, INST1_1, INST1_2, INST2, BUF1, and BUF2 in FIG. 11, as the glitch-considered power consumption information 242 in a case of considering glitch for only the selected node P1.

In Step ST37, the power consumption comparing unit 25 compares the glitch-unconsidered power consumption information 241 and the glitch-considered power consumption information 242 which have been respectively calculated in Steps ST32 and ST36, to each other and generates the power consumption comparison result 251. Specifically, the power consumption comparing unit 25 calculates a difference (=0.8064) of the sum of the toggle rate T corresponding to the power consumption of the net list 141, between the case (=4.008) of not considering glitch and the case (=4.8144) of considering glitch for only the selected node P1. Thus, the power consumption comparison result 251 in a case of considering glitch for only the selected node P1 is generated.

In Step ST38, the power consumption comparing unit 25 determines whether or not all nodes in the glitch generation source list 211 have been selected. In a case where a not-selected node is provided (no in Step ST38), the process returns to Step ST34. Thus, the processes of Steps ST34 to ST37 as described above repeat until all the nodes are selected.

Figure 12:
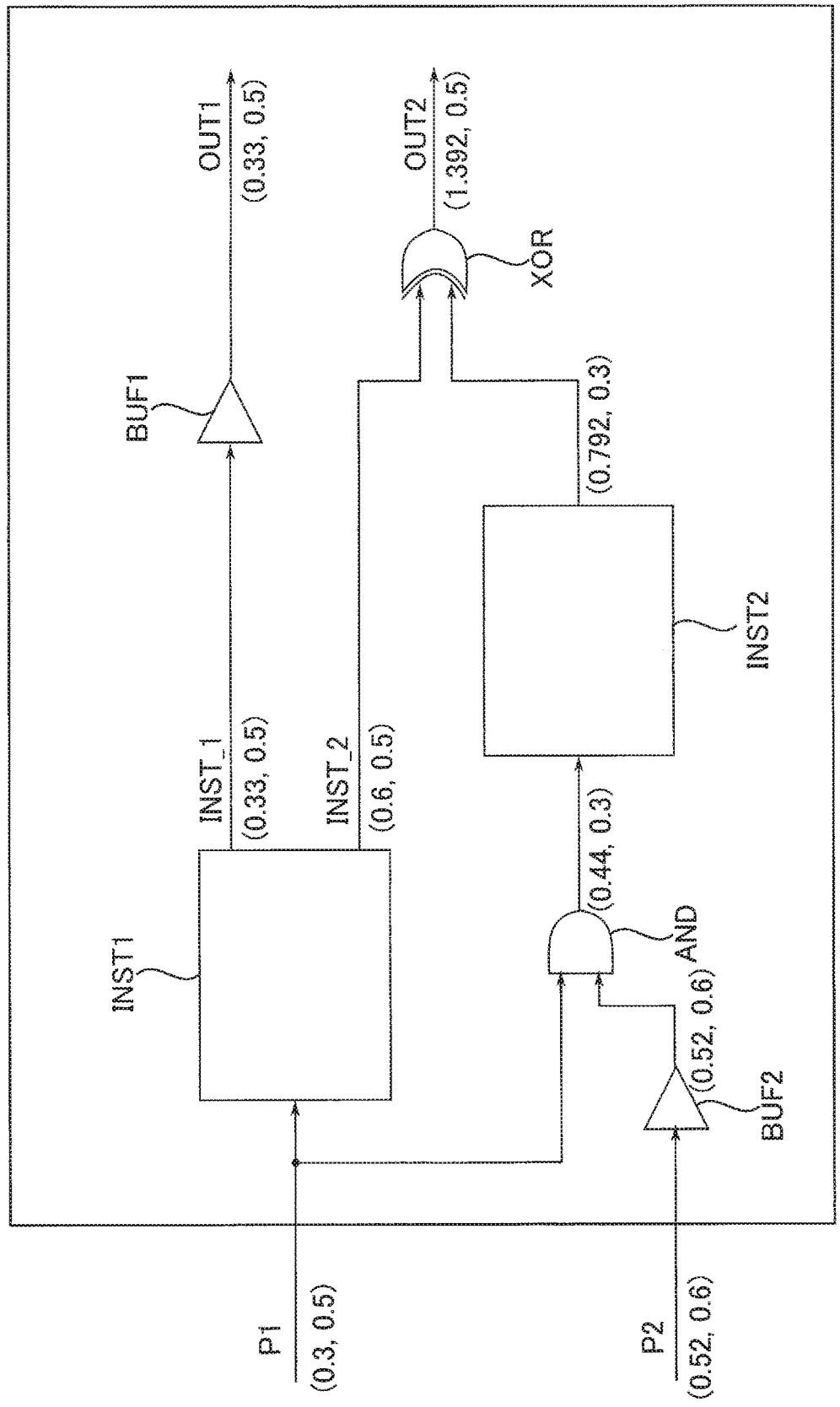
FIG. 12 is a schematic diagram to explain the glitch-considered determination operation information according to the embodiment.

For example, in a case where the node P2 is selected in the next Step ST34, the glitch-considered determination operation information 232 as shown in FIG. 12 is generated in the next Step ST35.

As shown in FIG. 12, the toggle rate T and the duty D at the nodes P1 and P2 have values of (T, D)=(0.3, 0.5) and (0.52 (=0.4×1.3), 0.6), respectively.

The toggle rate T and the duty D at the nodes INST1_1 and INST1_2 have values of (T, D)=(0.33 (=0.3×1.1), 0.5) and (0.6 (=0.3×2), 0.5), respectively.

The toggle rate T and the duty D at the nodes BUF1 and BUF2 do not change from the toggle rate T and the duty D at the nodes INST1_1 and P2, and thus have values of (T, D)=(0.33, 0.5) and (0.52, 0.6), respectively.

The toggle rate T and the duty D at the node AND have values of (T, D)=(0.44 (=0.3×0.6+0.52×0.5), 0.3 (=0.5×0.6)).

The toggle rate T and the duty D at the node INST2 have values of (T, D)=(0.7922 (=0.44×1.8), 0.3).

The toggle rate T and the duty D at the node XOR have values of (T, D)=(1.392 (=0.6+0.792), 0.5 (=0.5(1−0.3)+0.3(1−0.5))).

In the next Step ST36, 4.404 (=0.33+0.33+0.6+0.52+0.44+0.792+1.392) being the sum of the toggle rate T corresponding to the power consumption of the net list 141 is calculated as the glitch-considered power consumption information 242.

In the next Step ST37, a difference (=0.396) of the sum of the toggle rate T corresponding to the power consumption of the net list 141, between the case (=4.008) of not considering glitch and the case (=4.404) of considering glitch for only the selected node P2. Then, the power consumption comparison result 251 in a case of considering glitch for only the selected node P2 is generated.

After the processes as described above repeat, in a case where all the nodes have been selected (yes in Step ST38), the power consumption comparing unit 25 determines that generation of the power consumption comparison result 251 in a case of glitch occurring at the node is completed for all the nodes in the glitch generation source list 211.

Thus, the glitch influence evaluation processing for each glitch generation source ends.

1.2.2.3 Significant Glitch Generation Source Extraction Processing

Next, the significant glitch generation source extraction processing in the circuit design supporting processing according to the embodiment will be described with reference to the flowchart illustrated in FIG. 13. Steps ST51 to ST55 in FIG. 13 correspond to Step ST50 described with reference to FIG. 5. In Steps ST51 to ST55, the circuit design supporting apparatus 1 functions as the significant glitch generation source extraction unit 26.

Figure 13:
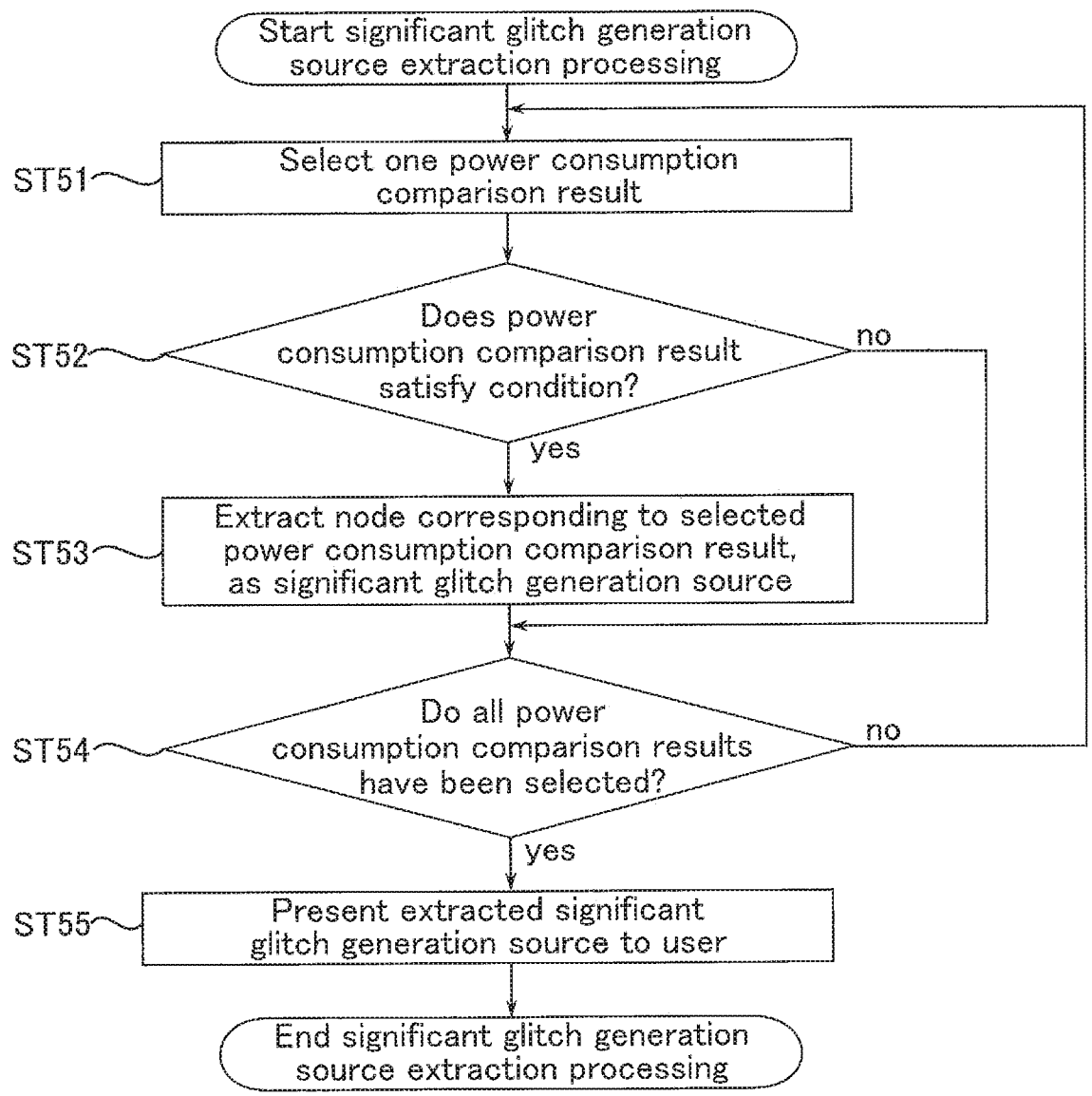
FIG. 13 is a flowchart to explain significant glitch generation source extraction processing in the circuit design supporting processing in the circuit design supporting apparatus according to the embodiment.

As shown in FIG. 13, in Step ST51, the significant glitch generation source extraction unit 26 selects one of power consumption comparison results 251 for each glitch generation source, which have been generated in Step ST36 in FIG. 8.

In Step ST52, the significant glitch generation source extraction unit 26 determines whether or not the power consumption comparison result 251 selected in Step ST51 satisfies a predetermined condition. The predetermined condition may be, for example, a condition of whether or not the value of the power consumption comparison result 251 exceeds a predetermined threshold. In a case where the power consumption comparison result 251 satisfies the predetermined condition (yes in Step ST52), the process proceeds to Step ST53. In a case where the power consumption comparison result 251 does not satisfy the predetermined condition (no in Step ST52), the process proceeds to Step ST54.

In Step ST53, the significant glitch generation source extraction unit 26 extracts a node corresponding to the selected power consumption comparison result 251, as a significant glitch generation source.

In Step ST54, the significant glitch generation source extraction unit 26 determines whether or not all the power consumption comparison results 251 have been selected. In a case where the not-selected power consumption comparison result 251 is provided (no in Step ST54), the process returns to Step ST51, and Steps ST51 to ST53 as described above repeat until all the power consumption comparison results 251 are selected. In a case where all the power consumption comparison results 251 have been selected (yes in Step ST54), the process proceeds to Step ST55.

In Step ST55, the significant glitch generation source extraction unit 26 lists up all significant glitch generation sources extracted in Step ST53, in the significant glitch generation source list 261, and presents the significant glitch generation source list 261 to the user. As a presenting method, any method of causing the user to recognize the significant glitch generation source may be applied. For example, the significant glitch generation source list 261 may be displayed in a display with the interface 16 or may be output on paper via a printer.

Thus, the user can specify a node at which power consumption may significantly change in a case of glitch occurring among the nodes in the net list 141, as the significant glitch generation source.

FIG. 14 is a conceptual diagram illustrating the significant glitch generation source list according to the embodiment.

As shown in FIG. 14, the significant glitch generation source list 261 includes information allowing specifying a node which may have a large influence on the power consumption of the net list 141 among the glitch generation sources. In the example in FIG. 14, the power consumption comparison result 251 generated in Step ST37 described above is described for all the glitch generation sources, along with the predetermined threshold (=0.5). "Countermeasure required" as a determination result is described for the node (glitch generation source) corresponding to the power consumption comparison result 251 which exceeds the predetermined threshold.

Specifically, as described with reference to FIG. 11, in a case where glitch occurs at the node P1, the power consumption comparison result (=0.8064) exceeds the threshold (=0.5). Therefore, in a case where the glitch occurs at the node P1, it is determined that the power consumption of the net list 141 increases to a considerable extent, and thus a determination result of "countermeasure required" is given.

Meanwhile, in a case where the glitch occurs at the node P2, the power consumption comparison result (=0.396) is smaller than the threshold (=0.5). Therefore, in a case where the glitch occurs at the node P2, it is determined that the power consumption of the net list 141 does not increase to the considerable extent, and thus the determination result of "countermeasure required" is not given.

Regarding other nodes AND, XOR, INST1_1, INST1_2, and INST2, similar determinations are performed. Thus, in the example in FIG. 14, the determination result of "countermeasure required" is given for the node AND, and a determination result of "no countermeasure required" is given for the nodes XOR, INST1_1, INST1_2, and INST2.

Since the significant glitch generation source list 261 as described above is presented to the user, the user can recognize the nodes P1 and AND to be significant glitch generation sources that particularly have a large influence on the power consumption, and can determine a direction of the subsequent design work.

Thus, the significant glitch generation source extraction processing ends.

1.3 Effects of Present Embodiment

According to the embodiment, it is possible to specify a glitch generation source having a significantly large influence on the power consumption. The effects will be described below.

According to the embodiment, the operation information determination unit 23 performs probability propagation of the glitch-unconsidered cycle based operation information 142 generated for the net list 141 by performing the cycle based logic simulation, and generates the glitch-unconsidered determination operation information 231. The operation information determination unit 23 performs probability propagation of the operation information considering glitch for one of the glitch generation sources in the glitch generation source list 211, based on the glitch-unconsidered cycle based operation information 142 and the glitch-considered cycle based operation information 221. Then, the operation information determination unit 23 generates the glitch-considered determination operation information 232. The glitch-considered determination operation information 232 is generated for each of the glitch generation sources. The power consumption calculation unit 24 and the power consumption comparing unit 25 compare the glitch-unconsidered power consumption information 241 based on the glitch-unconsidered determination operation information 231 and the glitch-considered power consumption information 242 based on the glitch-considered determination operation information 232, to each other and generate the power consumption comparison result 251. The power consumption comparison result 251 is generated for each of the plural pieces of glitch-considered determination operation information 232. The significant glitch generation source extraction unit 26 determines whether or not each of the power consumption comparison results 251 satisfies the predetermined condition. The significant glitch generation source extraction unit 26 generates the significant glitch generation source list 261 by specifying the glitch generation source for which it is determined to satisfy the predetermined condition, as the significant glitch generation source. Then, the significant glitch generation source extraction unit 26 presents the significant glitch generation source list 261 to the user. Thus, the user can specify the significant glitch generation source having a possibility of causing a significant increase of the power consumption among the countless glitch generation sources in the net list 141. Therefore, it is possible to appropriately recognize a node at which the countermeasure is required, in the subsequent circuit design. Accordingly, it is possible to suppress an increase of a load of the user on a circuit design.

2. Others

It should be noted that the above-described embodiment can be variously modified.

In the embodiment, a case where the predetermined threshold is used as the condition applied to the determination of the power consumption comparison result in the significant glitch generation source extraction processing is described. However, the embodiment is not limited thereto. For example, the significant glitch generation source extraction unit 26 may extract a glitch generation source in which the corresponding power consumption comparison result is included in the top few percent of the whole, among the glitch generation sources, as the significant glitch generation source.

In the embodiment, a case where, in the glitch influence evaluation processing, the operation information in a case where glitch occurs in one of the glitch generation sources is determined, and the glitch-considered determination operation information 232 is generated is described. However, the embodiment is not limited thereto. For example, the operation information determination unit 23 may similarly determine the operation information in a case where glitch occurs in two or more of the glitch generation sources and generate the glitch-considered determination operation information 232. In this case, the number of power consumption comparison results 251 may increase in accordance with the combination of the glitch generation sources in which glitch occurs. However, it is possible to more specifically recognize the influence of the glitch generation source on the power consumption and to specify a node at which the countermeasure is required, with high accuracy, by analyzing the power consumption comparison result 251 of each combination.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

What is claimed is:

1. A circuit design supporting method comprising:
   generating first determination operation information by performing a first probability propagation of first operation information of a circuit, the first operation information being obtained by performing a cycle based logic simulation on the circuit;
   extracting a plurality of glitch generation sources from the circuit;
   generating second determination operation information by performing a second probability propagation of second operation information of the circuit and, the second operation information being obtained based on the first operation information by considering first glitch for one of the glitch generation sources;
   comparing the first determination operation information and the second determination operation information to each other and determining whether or not a comparison result satisfies a condition; and
   performing the generating of the second determination operation information and the determining for each of the glitch generation sources and presenting, to a user, one or a plurality of glitch generation sources in which it is determined that the comparison result satisfies the condition.

2. The method of claim 1,
   wherein the determining includes:
   calculating first power consumption of the circuit based on the first determination operation information,
   calculating second power consumption of the circuit based on the second determination operation information, and
   determining whether or not a difference of the second power consumption from the first power consumption satisfies the condition.

3. The method of claim 2,
   wherein the condition includes whether or not the difference exceeds a threshold.

4. The method of claim 1,
   wherein the extracting of the glitch generation sources includes extracting a first node as one of the glitch generation sources, and
   an input from an outside of the circuit is supplied to the first node.

5. The method of claim 1,
   wherein the extracting of the glitch generation sources includes extracting a second node as one of the glitch generation sources, and
   an output of a cell configured to operate based on at least two inputs among a plurality of cells in the circuit is supplied to the second node.

6. The method of claim 1,
   wherein the extracting the glitch generation sources includes extracting a third node as one of the glitch generation sources, and
   an output of a black box cell among the cells in the circuit is supplied to the third node.

7. The method of claim 1,
   wherein the second operation information is generated without considering second glitch for the glitch generation sources other than the first glitch for the one of the glitch generation sources.

8. The method of claim 1,
   wherein the first determination operation information and the second determination operation information include a toggle rate and a duty at each of a plurality of nodes in the circuit.

9. The method of claim 8,
   wherein the considering of the first glitch for the one of the glitch generation sources includes correcting the toggle rate in the one of the glitch generation sources.

10. A non-transitory computer readable storage medium storing a program used by a processor, the program causing the processor to:
    generating first determination operation information, the first operation information by performing a first probability propagation of first operation information of a circuit, the first operation information being obtained by performing a cycle based logic simulation on the circuit;
    extracting a plurality of glitch generation sources from the circuit;
    generating second determination operation information by performing a second probability propagation of second operation information of the circuit and, the second operation information being obtained based on the first operation information by considering first glitch for one of the glitch generation sources;
    comparing the first determination operation information and the second determination operation information to each other and determining whether or not a comparison result satisfies a condition; and
    performing the generating of the second determination operation information and the determining for each of the glitch generation sources and presenting, to a user, one or a plurality of glitch generation sources in which it is determined that the comparison result satisfies the condition.

11. The storage medium of claim 10,
wherein the determining includes:
calculating first power consumption of the circuit based on the first determination operation information,
calculating second power consumption of the circuit based on the second determination operation information, and
determining whether or not a difference of the second power consumption from the first power consumption satisfies the condition.

12. The storage medium according to claim 11,
wherein the condition includes whether or not the difference exceeds a threshold.

13. The storage medium of claim 10,
wherein the extracting of the glitch generation sources includes extracting a first node as one of the glitch generation sources, and
an input from an outside of the circuit is supplied to the first node.

14. The storage medium of claim 10,
wherein the extracting of the glitch generation sources includes extracting a second node as one of the glitch generation sources, and
an output of a cell configured to operate based on at least two inputs among a plurality of cells in the circuit is supplied to the second node.

15. The storage medium of claim 10,
wherein the extracting the glitch generation sources includes extracting a third node as one of the glitch generation sources, and
an output of a black box cell among the cells in the circuit is supplied to the third node.

16. The storage medium of claim 10,
wherein the second operation information is generated without considering second glitch for the glitch generation sources other than the first glitch for the one of the glitch generation sources is not considered.

17. The storage medium of claim 10,
wherein the first determination operation information and the second determination operation information include a toggle rate and a duty at each of a plurality of nodes in the circuit.

18. The storage medium of claim 17,
wherein the considering of the first glitch for the one of the glitch generation sources includes correcting the toggle rate in the one of the glitch generation sources.

* * * * *